US010554716B2

(12) United States Patent
Vishwanath et al.

(10) Patent No.: US 10,554,716 B2
(45) Date of Patent: *Feb. 4, 2020

(54) SYSTEMS AND METHODS FOR GENERATING, PROVIDING, AND RENDERING QUICK LOAD ARTICLES

(71) Applicant: Facebook, Inc., Menlo Park, CA (US)

(72) Inventors: Tirunelveli R. Vishwanath, Sunnyvale, CA (US); Martin A. Ortega, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,464

(22) Filed: Jan. 22, 2019

(65) Prior Publication Data

US 2019/0158557 A1 May 23, 2019

Related U.S. Application Data

(63) Continuation of application No. 15/165,958, filed on May 26, 2016, now Pat. No. 10,250,656.

(51) Int. Cl.
| | |
|---|---|
| G06F 15/16 | (2006.01) |
| H04L 29/06 | (2006.01) |
| H04L 29/08 | (2006.01) |
| G06Q 50/00 | (2012.01) |
| G06Q 10/10 | (2012.01) |

(52) U.S. Cl.
CPC ......... *H04L 65/601* (2013.01); *G06Q 10/101* (2013.01); *G06Q 10/107* (2013.01); *G06Q 50/01* (2013.01); *H04L 67/02* (2013.01); *H04L 67/1097* (2013.01); *H04L 67/306* (2013.01); *H04L 67/42* (2013.01)

(58) Field of Classification Search
USPC .......................... 709/217, 201, 202, 203, 231
See application file for complete search history.

(56) References Cited

U.S. PATENT DOCUMENTS

| | | |
|---|---|---|
| 6,643,641 B1 | 11/2003 | Snyder |
| 9,740,668 B1 | 8/2017 | Saurav |
| 9,747,618 B1 | 8/2017 | Reiss |
| 2006/0069984 A1 | 3/2006 | Jaeger |
| 2011/0099294 A1 | 4/2011 | Kapur |
| 2012/0101996 A1 | 4/2012 | Lim |
| 2014/0189534 A1 | 7/2014 | Liu |
| 2017/0163729 A1 | 6/2017 | Balz |

*Primary Examiner* — Lan Dai T Truong
(74) *Attorney, Agent, or Firm* — Sheppard Mullin Richter & Hampton LLP

(57) ABSTRACT

Systems, methods, and non-transitory computer-readable media can transmit a quick load article request identifying a quick load article. One or more media content elements associated with the quick load article are received, the one or more media content elements comprising a first quick load embedded web content element. The first quick load embedded web content element comprises embedded web content element information identifying a first embedded web content element and snapshot information identifying a first snapshot associated with the first embedded web content element. The quick load article is rendered, wherein the rendering the quick load article comprises rendering the first snapshot in place of the first embedded web content element.

20 Claims, 8 Drawing Sheets

SYSTEMS AND METHODS FOR GENERATING, PROVIDING, AND RENDERING QUICK LOAD ARTICLES

CROSS-REFERENCE TO RELATED APPLICATIONS

This application is a continuation of U.S. patent application Ser. No. 15/165,958, filed on May 26, 2016 and entitled "SYSTEMS AND METHODS FOR GENERATING, PROVIDING, AND RENDERING QUICK LOAD ARTICLES", which is incorporated herein by reference in its entirety.

FIELD OF THE INVENTION

The present technology relates to the field of social networks. More particularly, the present technology relates to generation, provision, and rendering of quick load articles.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be given the opportunity to interact with media content items posted to the social networking system by other users. For example, users can share and/or view articles on the social networking system. Articles can be posted directly to the social networking system. Alternatively, articles can be shared from external sources. For example, a user can share a link to an online article published by a newspaper or other publication. A user can view, comment on, share, or otherwise interact with articles posted by other users. By improving a user's experience with sharing and viewing articles on the social networking system, a user's experience with the social networking system as a whole can be improved.

SUMMARY

Various embodiments of the present disclosure can include systems, methods, and non-transitory computer readable media configured to transmit a quick load article request identifying a quick load article. One or more media content elements associated with the quick load article are received, the one or more media content elements comprising a first quick load embedded web content element. The first quick load embedded web content element comprises embedded web content element information identifying a first embedded web content element and snapshot information identifying a first snapshot associated with the first embedded web content element. The quick load article is rendered, wherein the rendering the quick load article comprises rendering the first snapshot in place of the first embedded web content element.

In an embodiment, the rendering the quick load article further comprises replacing the first snapshot with the first embedded web content element once the first embedded web content element has completed loading.

In an embodiment, the first snapshot has been selected from a plurality of snapshots associated with the first embedded web content element.

In an embodiment, the quick load article request comprises mobile device information.

In an embodiment, the first snapshot was selected from the plurality of snapshots based on the mobile device information.

In an embodiment, the mobile device information comprises screen dimension information.

In an embodiment, the mobile device information comprises screen density information.

In an embodiment, the plurality of snapshots comprise a plurality of image dimensions and image resolutions.

In an embodiment, the snapshot information comprises snapshot dimension information.

In an embodiment, the snapshot information comprises snapshot resolution information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
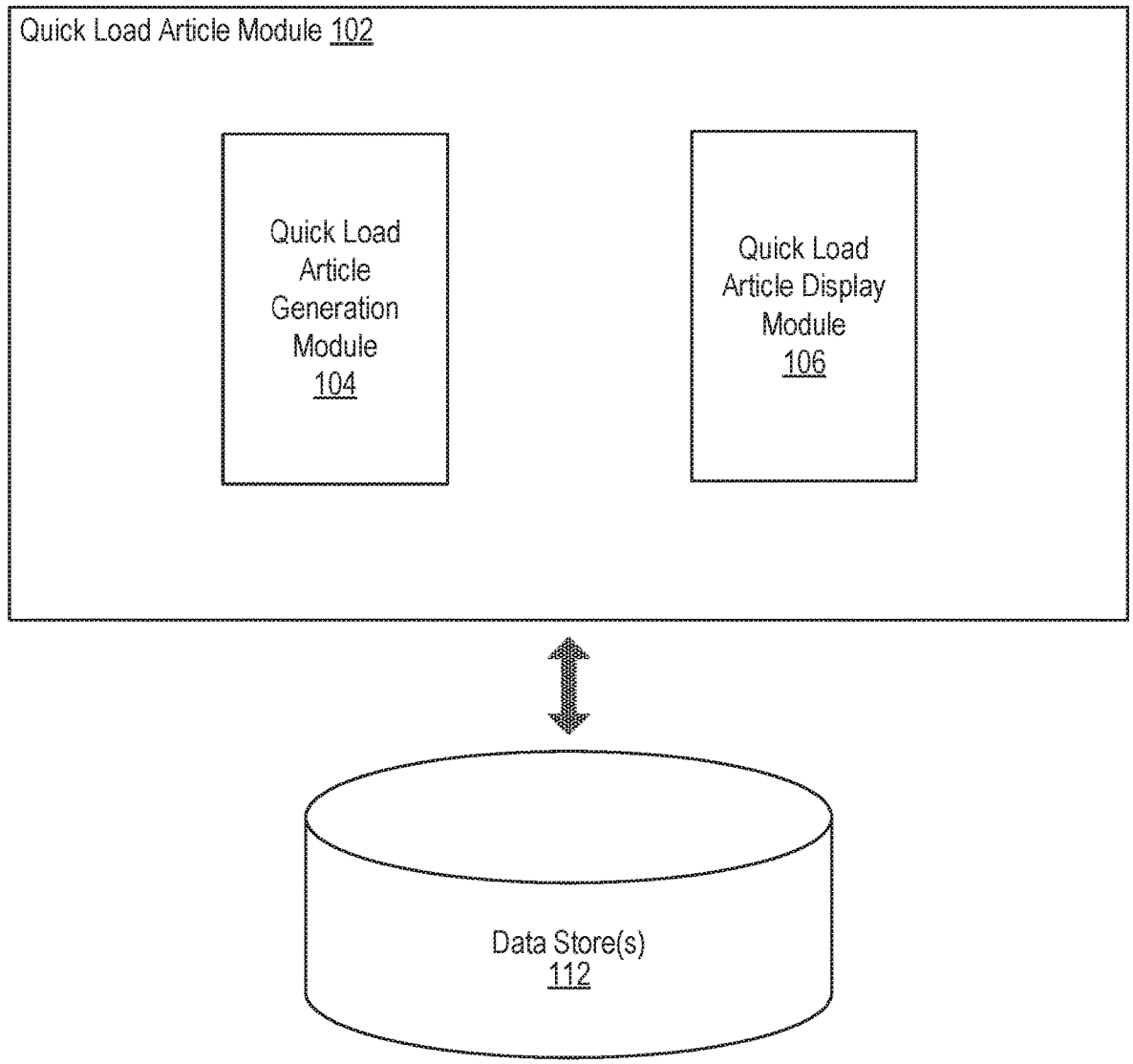
FIG. 1 illustrates an example system including a quick load article module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Quick Load Article Generation and Display

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can be given the opportunity to interact with media content items posted to the social networking system by other users. For example, users can share and/or view articles on the social networking system. Articles can be posted directly to the social networking system. Alternatively, articles can be shared from external sources. For example, a user can share a link to an online article published by a newspaper or other publication. A user can view, comment on, share, or otherwise interact with articles posted by other users. By improving a user's experience with sharing and viewing articles on the social networking system, a user's experience with the social networking system as a whole can be improved.

It continues to be an important interest for a social networking system to improve the user experience of users sharing and viewing content on the social networking system. Continued user interaction with content posted to the social networking is an important aspect of maintaining continued interest in and participation on the social networking system. However, articles can contain numerous embedded web content elements which may take a long time to load and disrupt user experience in viewing such articles. This is particularly true today, when articles can contain lots of embedded web content from other sources, e.g., Twitter, YouTube, Instagram, etc. These embedded web content elements are included in articles to increase user interest, but if such embedded web content elements cause negative user experiences, users may lose interest in viewing an article, or be dissuaded from viewing future articles. One example of negative user experience caused by embedded web content elements can include long load times, and blank spaces in articles where embedded web content elements have not yet loaded. In another example, embedded web content elements can cause slow frame rates, resulting in uneven scrolling through an article due to excessive memory consumption by embedded web content elements. In yet another example, embedded web content elements can cause article layout restructuring disruptions, which can occur when a user begins reading an article before all embedded web content elements have loaded. As the embedded web content elements load, they can push other media content elements to different positions to fit the loaded embedded web content elements, causing the user's view to be disrupted as text or images or other elements are repositioned.

An improved approach rooted in computer technology overcomes the foregoing and other disadvantages associated with conventional approaches specifically arising in the realm of computer technology. Based on computer technology, the disclosed technology can receive an article, and parse the article into different media content elements. For example, an article can be parsed into one or more text elements, one or more image elements, one or more video elements, and/or one or more embedded web content elements. Any media content elements that are in a format that can be rendered natively by a social network application or other browser application can be stored and rendered in that format. For example, text elements, image elements, and/or video elements can be stored in one or more formats that can be rendered natively by a social network application. For other media content elements that cannot be rendered natively, such as embedded web content elements, the disclosed technology can render an embedded web content element on a mobile device, and take an image, or snapshot, of the rendered embedded web content element. The snapshot can be saved as an image that can be rendered natively by the social network application. The article can be saved as a quick load article by creating quick load embedded web content elements, which comprise both embedded web content element information identifying an embedded web content element, and snapshot information identifying snapshots associated with the embedded web content element. When a later user requests a quick load article, for example, by clicking on a link on a social networking feed, the quick load article can load with one or more snapshots in the place of any embedded web content elements. The snapshots can be loaded relatively quickly and efficiently, whereas embedded web content items may take a long time to load and negatively affect user experience. In this way, the user is provided with an improved viewing experience, as the user can quickly see snapshots representing each embedded web content element, rather than a blank space while the embedded web content element is loading. Furthermore, additional benefits may be provided. For example, quick load articles can have an improved frame rate when a user scrolls through because snapshots require less memory than embedded web content, and quick load articles can result in fewer layout restructuring disruptions caused by slowly loading embedded web content elements.

FIG. 1 illustrates an example system 100 including an example quick load article module 102 configured to generate and display quick load articles, according to an embodiment of the present disclosure. The quick load article module 102 can be configured to receive an article, and parse the article into different media content elements. For example, an article can be parsed into one or more text elements, one or more image elements, one or more video elements, and/or one or more embedded web content elements. For a given article, the quick load article module 102 can be configured to compile a list of embedded web content elements. The list of embedded web content elements can be transmitted to one or more mobile devices for rendering of each embedded web content element. Each embedded web content element of the list of embedded web content elements can be rendered on one or more mobile devices. Once an embedded web content element is rendered on a mobile device, a snapshot of the rendered embedded web content element can be taken and stored. Each embedded web content element can be converted into a quick load embedded web content element by adding snapshot information identifying one or more snapshots associated with the embedded web content element. As such, quick load embedded web content elements comprise embedded web content element information, identifying an embedded web content element, and snapshot information, identifying one or more snapshots associated with the embedded web content element. A quick load article can be created by storing the one or more media content elements of the article, with one or more embedded web content elements replaced by quick load embedded web content elements. When a later user requests the quick load article, for example, by clicking on a link on a social networking feed, the quick load article can load with one or more snapshots in the place of embedded web content elements.

As shown in the example of FIG. 1, the quick load article module 102 can include a quick load article generation module 104 and a quick load article display module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

The quick load article generation module 104 can be configured to receive an article and generate a quick load article based on the article. In certain embodiments, the quick load article generation module 104 can be configured to receive an article in an HTML format. The article can be parsed for one or more media content elements that make up the article. For example, the article can be parsed into one or more text elements, one or more image elements, one or more video elements, and/or one or more embedded web content elements. The quick load article generation module 104 can be configured to compile a list of all embedded web content elements in the article. The list of embedded web content elements can be transmitted to one or more mobile devices for rendering of each embedded web content element. In certain embodiments, the list of embedded web content elements can be transmitted to a data center comprising one or more mobile devices. Each embedded web content element can be rendered on the one or more mobile devices, or a subset of the one or more mobile devices, and one or more snapshots of each rendered embedded web content element can be taken, creating snapshot image versions of the rendered embedded web content element. The one or more snapshots can be stored for future use. Although many of the examples and descriptions disclosed herein will make reference to interacting with mobile devices, it should be understood that the disclosed technology can also be applied to non-mobile computing devices, such as desktop or laptop computers. An embedded web content element can be converted to a quick load embedded web content element by appending snapshot information identifying one or more snapshots associated with the embedded web content element. For example, the snapshot information can include one or more URLs identifying locations of the one or more snapshots. The plurality of media content elements that make up the article can be stored as a quick load article by converting any embedded web content elements into quick load embedded web content elements. The quick load article generation module 104 is discussed in greater detail herein.

The quick load article display module 106 can be configured to display a quick load article on a mobile device. In certain embodiments, the quick load article display module 106 can transmit a quick load article request, requesting rendering of a quick load article. For example, this request may be sent by a social networking application on a user's mobile device in response to a user clicking on a link associated with the quick load article. The quick load article display module 106 can receive one or more media content elements associated with the quick load article to the mobile device for rendering on the mobile device. The one or more media content elements can contain one or more quick load embedded web content elements. Each quick load embedded web content element can contain embedded web content element information identifying an embedded web content element, and snapshot information identifying one or more snapshots associated with the embedded web content element, as discussed above. As each embedded web content element can be associated with more than one snapshot, a mobile device appropriate snapshot can be selected from the snapshots for use with a particular mobile device. The mobile device appropriate snapshot can be selected based on mobile device characteristics of the mobile device. For example, the mobile device characteristics can comprise screen size information, and screen density information. When a quick load embedded web content element is transmitted to the mobile device, the quick load embedded web content element can include the mobile device appropriate snapshot itself, or the snapshot information included in the quick load embedded web content element can identify an address (e.g., URL) for the mobile device to retrieve the mobile device appropriate snapshot. When the article is rendered on the mobile device, the mobile device appropriate snapshot can be displayed in place of the embedded web content element. In certain embodiments, the mobile device appropriate snapshot can be displayed while the embedded web content is loading, and then be replaced by the embedded web content once it has finished loading. The quick load article display module 106 is discussed in greater detail herein.

The quick load article module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the quick load article module 102 can be implemented, in part or in whole, as software running on one or more computing devices or systems, such as on a server computing system or a user (or client) computing system. For example, the quick load article module 102 or at least a portion thereof can be implemented as or within an application (e.g., app), a program, or an applet, etc., running on a user computing device or a client computing system, such as the user device 610 of FIG. 6. In another example, the quick load article module 102 or at least a portion thereof can be implemented using one or more computing devices or systems that include one or more servers, such as network servers or cloud servers. In some instances, the quick load article module 102 can, in part or in whole, be implemented within or configured to operate in conjunction with a social networking system (or service), such as the social networking system 630 of FIG. 6. It should be understood that there can be many variations or other possibilities.

The quick load article module 102 can be configured to communicate and/or operate with the at least one data store 112, as shown in the example system 100. The data store 112 can be configured to store and maintain various types of data. In some implementations, the data store 112 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 112 can store information that is utilized by the quick load article module 102. For example, the data store 112 can store article information, media content element information, a plurality of snapshots, mobile device information, and the like. It is contemplated that there can be many variations or other possibilities.

Figure 2:
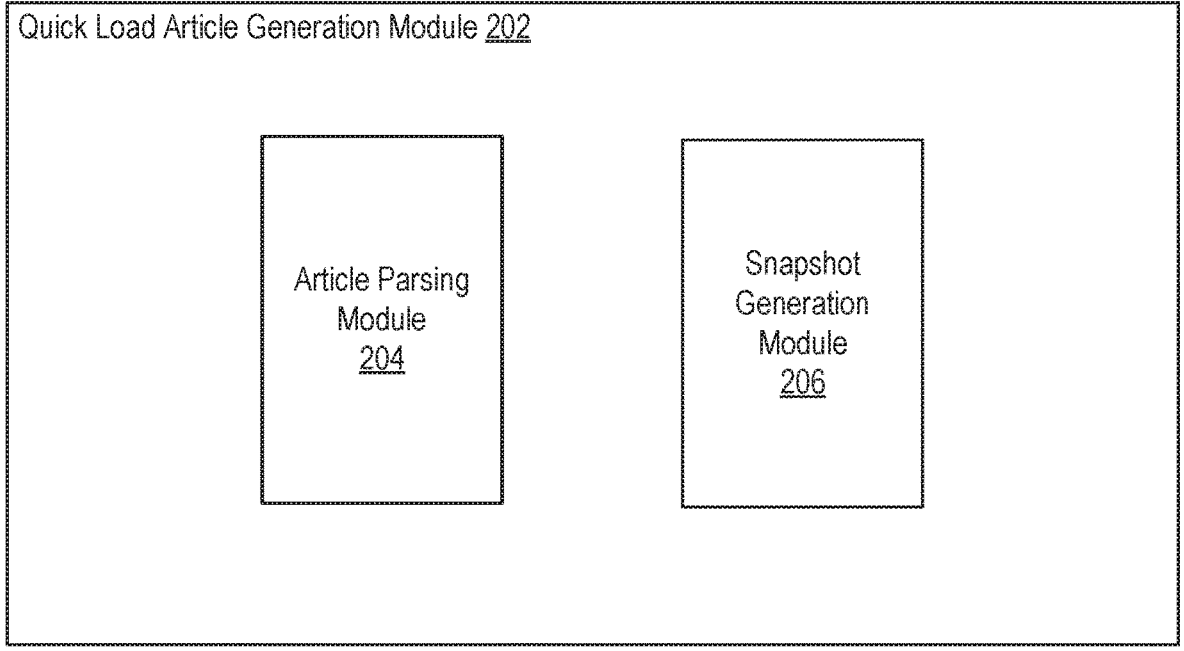
FIG. 2 illustrates an example quick load article generation module, according to an embodiment of the present disclosure.

FIG. 2 illustrates an example quick load article generation module 202 configured to generate quick load articles, according to an embodiment of the present disclosure. In some embodiments, the quick load article generation module 104 of FIG. 1 can be implemented as the example quick load article generation module 202. As shown in FIG. 2, the quick load article generation module 202 can include an article parsing module 204 and a snapshot generation module 206.

The article parsing module 204 can be configured to receive an article, and parse the article into one or more media content elements. For example, if an article comprises a first text section, followed by a first image, followed by a second text section, followed by a first embedded web content item (e.g., a tweet, or an Instagram image), followed by a third section of text, the article can be parsed into a first text element, a first image element, a second text element, a first embedded web content element, and a third text element. In certain embodiments, as will be described in greater detail below, each embedded web content element can be converted into a quick load embedded web content element by appending snapshot information identifying one or more snapshots associated with the embedded web content element. In certain embodiments, the article parsing module 204 can be configured to generate a list of embedded web content elements in an article, and to transmit the list of embedded web content elements to the snapshot generation module 206 for generation of snapshots.

The snapshot generation module 206 can be configured to generate one or more snapshots for one or more embedded web content elements. In certain embodiments, the snapshot generation module 206 receives a list of embedded web content elements identifying one or more embedded web content elements. Each embedded web content element in the list of embedded web content elements can be identified, for example, by a URL and/or HTML. Once the snapshot generation module 206 receives the list of embedded web content elements, the snapshot generation module 206 renders a first embedded web content element of the list of embedded web content elements on one or more mobile devices. Once the first embedded web content element is rendered, a snapshot is taken of the rendered embedded web content element, creating an image version of the embedded web content element. In certain embodiments, an embedded web content element can be rendered on a plurality of mobile devices, each of the plurality of mobile devices having different screen characteristics. For example, each mobile device can have a different screen size or screen width, such that a plurality of snapshots having different dimensions are taken of the first embedded web content element. In certain embodiments, each mobile device can take multiple snapshots at different resolutions, such that for each screen size, multiple snapshots having different resolutions are taken. Each embedded web content element in the list of embedded web content elements is loaded on the plurality of mobile devices, and snapshots of each embedded web content element are taken and stored. Once the snapshot generation module 206 has worked through the entire list of embedded web content elements, each embedded web content element has a plurality of snapshots of varying dimensions and varying resolutions associated with it. Each embedded web content element can be modified into a quick load embedded web content element, wherein the quick load embedded web content element includes embedded web content element information (e.g., a URL and/or HTML identifying the embedded web content element) and snapshot information identifying the plurality of snapshots associated with the embedded web content element. Snapshot information can include URLs for each of the plurality of snapshots, and dimension and resolution information for each of the plurality of snapshots. A quick load article comprises the one or more media content elements of an article, with any embedded web content elements in the article converted into quick load embedded web content elements, i.e., by appending snapshot information.

Figure 3:
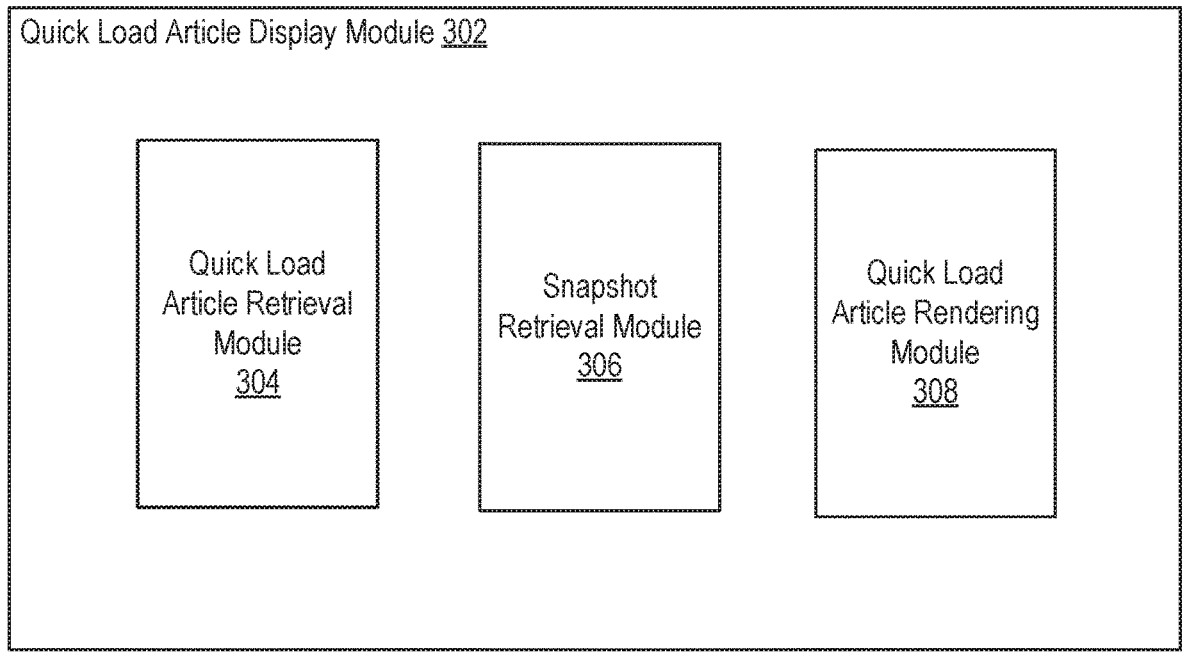
FIG. 3 illustrates an example quick load article display module, according to an embodiment of the present disclosure.

FIG. 3 illustrates an example quick load article display module 302 configured to render a quick load article, according to an embodiment of the present disclosure. In some embodiments, the quick load article display module 106 of FIG. 1 can be implemented as the example quick load article display module 302. As shown in FIG. 3, the quick load article display module 302 can include a quick load article retrieval module 304, a snapshot retrieval module 306, and a quick load article rendering module 308.

The quick load article retrieval module 304 can be configured to transmit a quick load article request, requesting a quick load article for rendering on a user's mobile device. For example, if a user is browsing a social networking system feed via a social network application on the user's mobile device, and clicks on a link to view a quick load article, the quick load article retrieval module 304 can transmit a quick load article request requesting the quick load article. The quick load article retrieval module 304 receives one or more media content elements associated with the requested quick load article. The one or more media content elements can include one or more quick load embedded web content elements. While the quick load article retrieval module 304 and various other modules disclosed herein may be discussed from a particular vantage point, it should be appreciated that opposite or complementary vantage points also fall within the scope of the present disclosure. For example, whereas the quick load article retrieval module 304 has been described as transmitting a quick load article request and receiving one or more media content elements associated with a quick load article, a complementary quick load article retrieval module can be configured to receive the quick load article request, and transmit the one or more media content elements associated with the quick load article to a mobile device.

The snapshot retrieval module 306 can be configured to identify a mobile device appropriate snapshot based on an embedded web content element, and mobile device information. As discussed above, an embedded web content element can be associated with a plurality of snapshots, each snapshot having particular dimensions (e.g., screen width) and resolution. When the quick load article retrieval module 304 requests a quick load article, the quick load article request can include mobile device information identifying various mobile device display characteristics of the mobile device. For example, the mobile device information can identify the screen width and screen density (or resolution) of the mobile device. Alternatively, the mobile device information can identify a particular mobile device model, from which the screen width and screen density can be inferred. Based on the mobile device information, a mobile device appropriate snapshot is selected from the plurality of snapshots associated with the embedded web content element. For example, if a mobile device has a screen width of 1080 and a density of 400, a mobile device appropriate snapshot can be selected that most closely matches the screen width and density of the mobile device.

The quick load article rendering module 308 can be configured to render a quick load article on a user mobile device. The quick load article rendering module 308 can receive one or more media content elements from the quick load article retrieval module 304, and render each of the media content elements to display a quick load article. When the quick load article retrieval module 304 transmits the one or more media content elements to the quick load article rendering module 308, each quick load embedded web content element can comprise snapshot information identifying the mobile device appropriate snapshot selected for each embedded web content element. In this way, a mobile device appropriate snapshot for each embedded web content element can be retrieved and rendered in place of each embedded web content element. Snapshot information can include a URL or address associated with the mobile device appropriate snapshot, a width, a height, and a resolution (or scale) of the mobile device appropriate snapshot, and the like. By rendering a snapshot in place of an embedded web content element, a user's viewing experience can be improved for various reasons. For example, it will typically be the case that the rendering of a snapshot will take place much more quickly than loading and rendering an embedded web content element, so the user is presented with the visual elements of a quick load article more quickly than if the user had to wait for each embedded web content element to load. Furthermore, snapshots are images, which generally consume fewer resources than embedded web content elements, thereby improving computing performance and frame rate as a user scrolls through the quick load article. Additionally, embedded web content elements can cause shifting or repositioning of other media content elements (such as text surrounding an embedded web content element) as the embedded web content element loads. A snapshot loaded quickly in place of an embedded web content element quickly sets the dimensions of the embedded web content article so that even once an embedded web content element loads, it simply replaces the space occupied by the snapshot and does not require shifting or repositioning of other media content elements. In certain embodiments, a snapshot can be permanently displayed in a quick load article in place of an embedded web content element. In other embodiments, a snapshot can be displayed in place of an embedded web content element while the embedded web content element loads, and then be replaced by the embedded web content element once loading is completed.

Figure 4A:
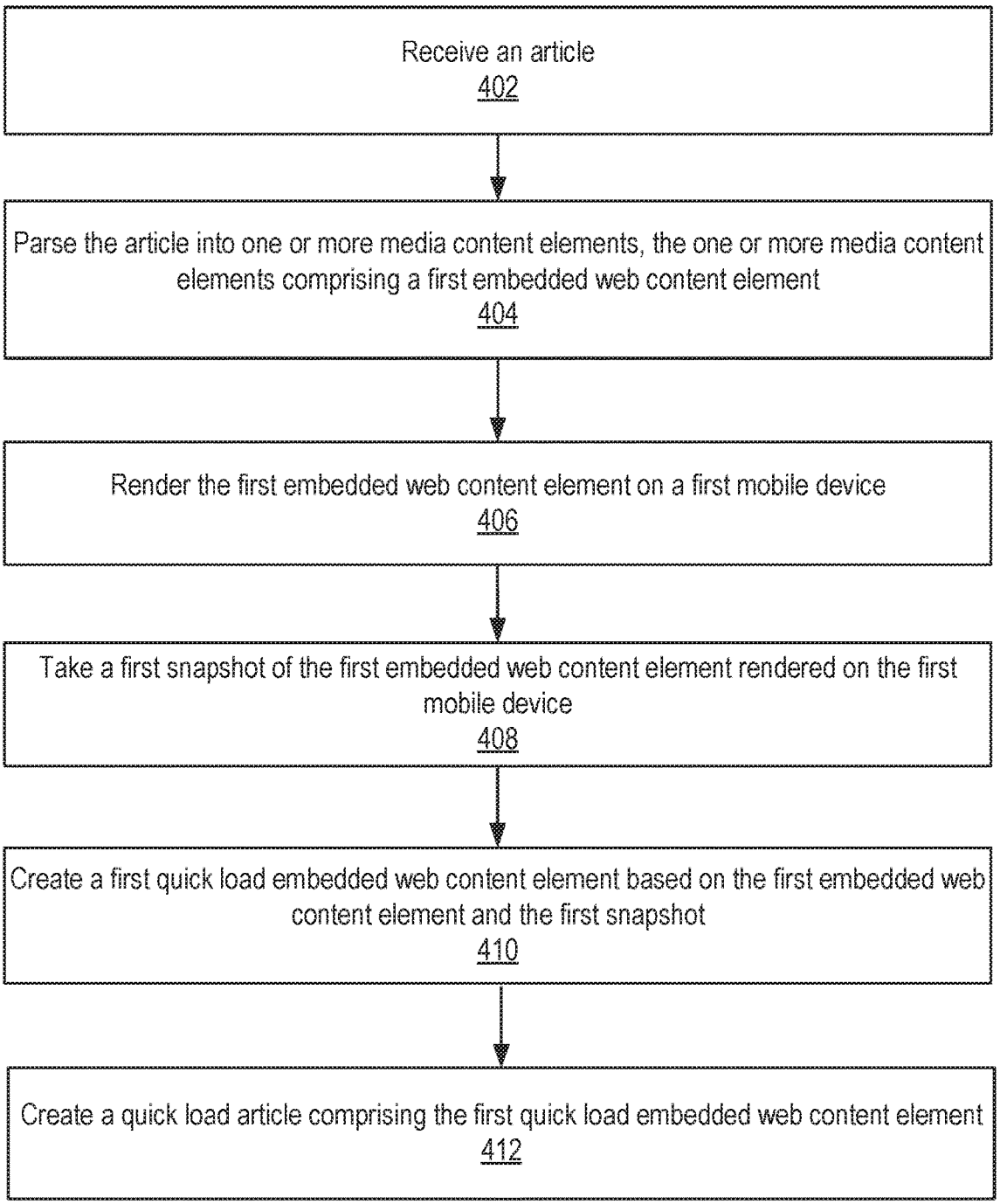
FIG. 4A illustrates an example method for creating a quick load article, according to an embodiment of the present disclosure.

FIG. 4A illustrates an example method 400 associated with creating a quick load article, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can receive an article. At block 404, the example method 400 can parse the article into one or more media content elements, the one or more media content elements comprising a first embedded web content element. At block 406, the example method 400 can render the first embedded web content element on a first mobile device. At block 408, the example method 400 can take a first snapshot of the first embedded web content element rendered on the first mobile device. At block 410, the example method 400 can create a first quick load embedded web content element based on the first embedded web content element and the first snapshot. At block 412, the example method 400 can create a quick load article comprising the first quick load embedded web content element. Other suitable techniques that incorporate various features and embodiments of the present technology are possible.

Figure 4B:
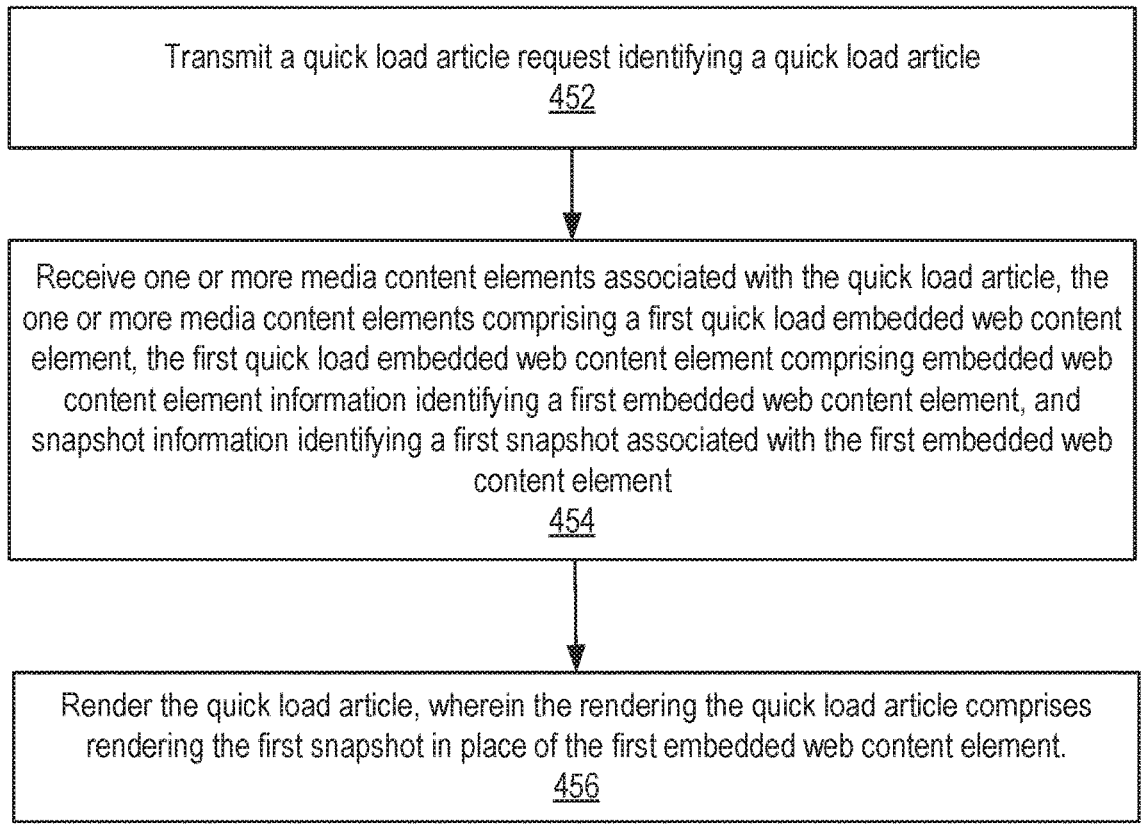
FIG. 4B illustrates an example method for rendering a quick load article, according to an embodiment of the present disclosure.

FIG. 4B illustrates an example method 450 associated with rendering a quick load article, according to an embodiment of the present disclosure. It should be appreciated that there can be additional, fewer, or alternative steps performed in similar or alternative orders, or in parallel, based on the various features and embodiments discussed herein unless otherwise stated.

At block 452, the example method 450 can transmit a quick load article request identifying a quick load article. At block 454, the example method 450 can receive one or more media content elements associated with the quick load article, the one or more media content elements comprising a first quick load embedded web content element, the first quick load embedded web content element comprising embedded web content element information identifying a first embedded web content element, and snapshot information identifying a first snapshot associated with the first embedded web content element. At block 456, the example method 450 can render the quick load article, wherein the rendering the quick load article comprises rendering the first snapshot in place of the first embedded web content element. Other suitable techniques that incorporate various features and embodiments of the present technology are possible.

Figure 5:
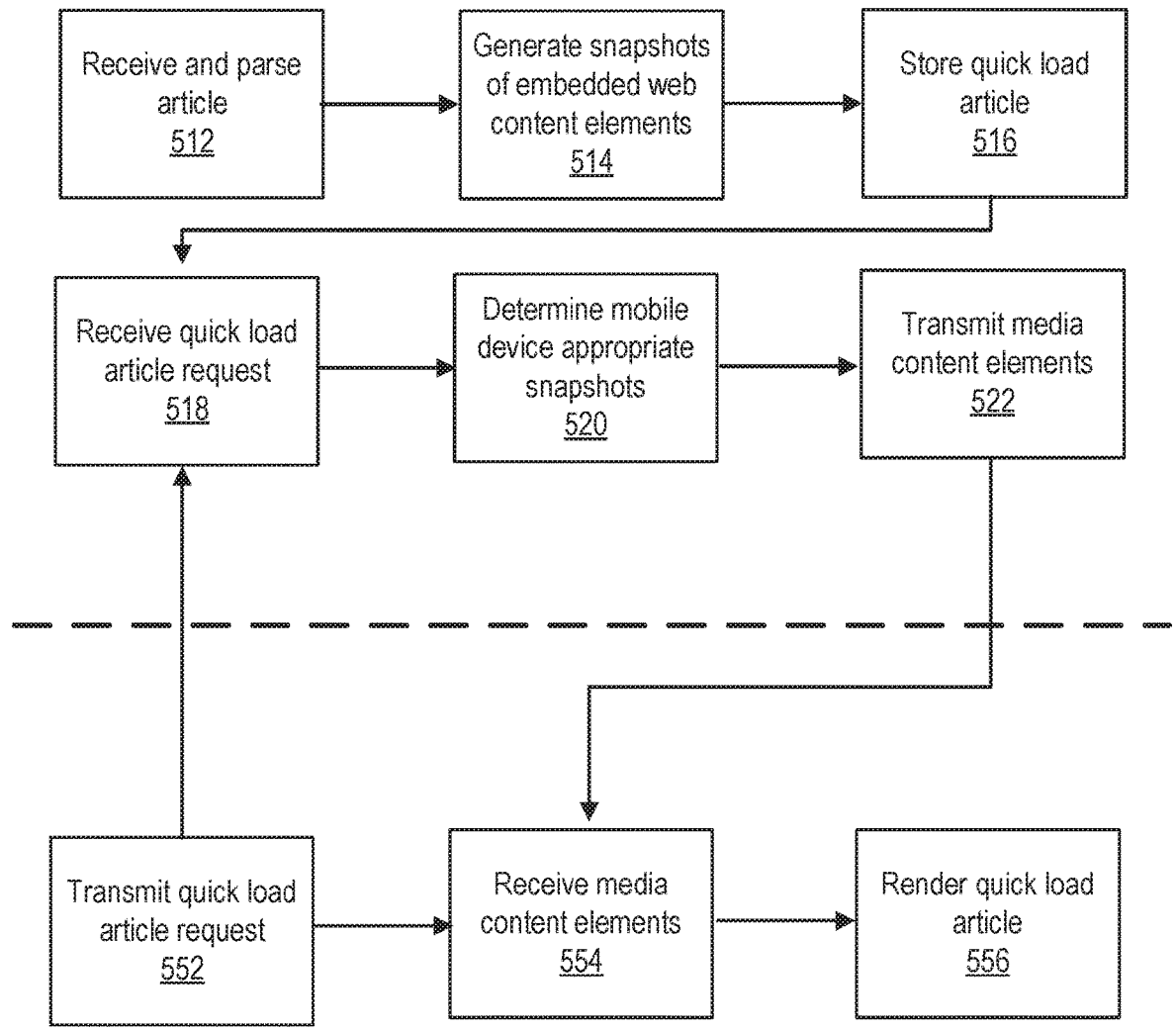
FIG. 5 illustrates an example scenario of a server side and a client side exchanging information, according to an embodiment of the present disclosure.

FIG. 5 illustrates an example scenario 500 in which a server side 510 and a client side 550 exchange information, according to an embodiment of the present disclosure. At block 512, the server side 510 receives an article and parses it into one or more media content elements. The one or more media content elements include one or more embedded web content elements. At block 514, the server side 510 generates snapshots of all embedded web content elements in the article, as discussed in greater detail above. At block 516, the article is converted into a quick load article by converting each embedded web content element in the article into a quick load embedded web content element. Each quick load embedded web content element comprises embedded web content element information, identifying an embedded web content element, and snapshot information, identifying one or more snapshots associated with the embedded web content element.

At block 552, the client side 550 transmits a quick load article request to the server side 510. The server side 510 receives the quick load article request at block 518. The quick load article request might occur, for example, as a result of a user clicking on a link on the user's mobile device to open a quick load article. In certain embodiments, the quick load article request includes mobile device information. At block 520, the server side 510 determines mobile device appropriate snapshots for each quick load embedded web content element based on the mobile device information. In certain embodiments, determining a mobile device appropriate snapshot can include selecting from a plurality of snapshots a snapshot that best matches mobile device display characteristics of the user's mobile device. At block 522, media content elements associated with the quick load article (including quick load embedded web content elements and snapshot information identifying one or more snapshots for each quick load embedded web content element) are transmitted to the client side 550, which receives the media content elements at block 554. At block 556, the client side 550 renders the quick load article 556. In certain embodiments, rendering the quick load article 556 comprises rendering snapshots in place of embedded web content elements. For example, if a mobile device appropriate snapshot has been selected for each quick load embedded web content element, the mobile device appropriate snapshot can be rendered in place of each embedded web content element.

Although various blocks have been described as being associated with a server side 510 or a client side 550, it should be appreciated that various features may be implemented differently while still remaining within the scope of the present disclosure. For example, the client side may be provided with snapshot information for all snapshots associated with each quick load embedded web content element, and the client side may be tasked with determining mobile device appropriate snapshots based on mobile device information.

Social Networking System—Example Implementation

Figure 6:
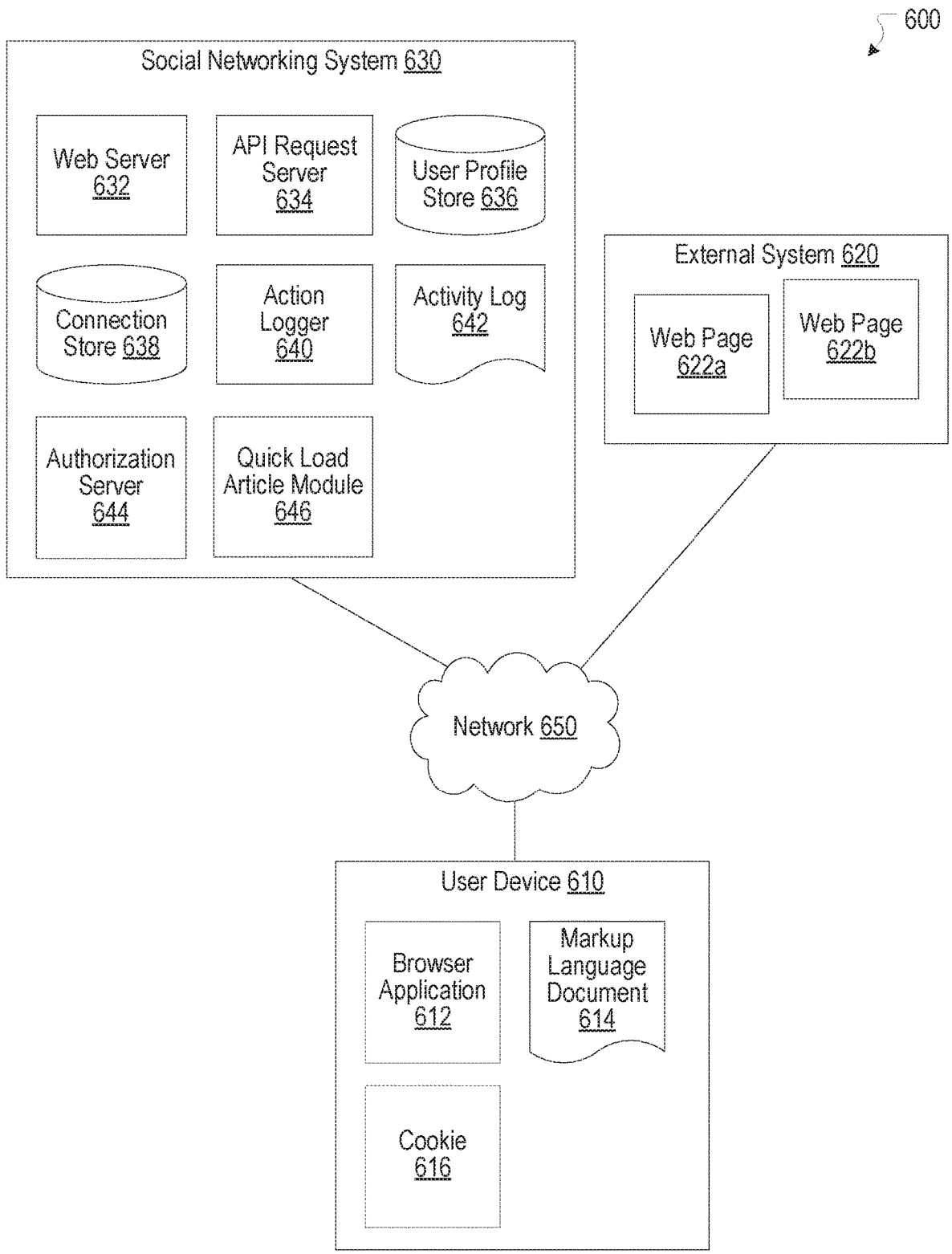
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a quick load article module 646. The quick load article module 646 can, for example, be implemented as the quick load article module 102, as discussed in more detail herein. As discussed previously, it should be appreciated that there can be many variations or other possibilities. For example, in some embodiments, one or more functionalities of the quick load article module 646 can be implemented in the user device 610.

Hardware Implementation

Figure 7:
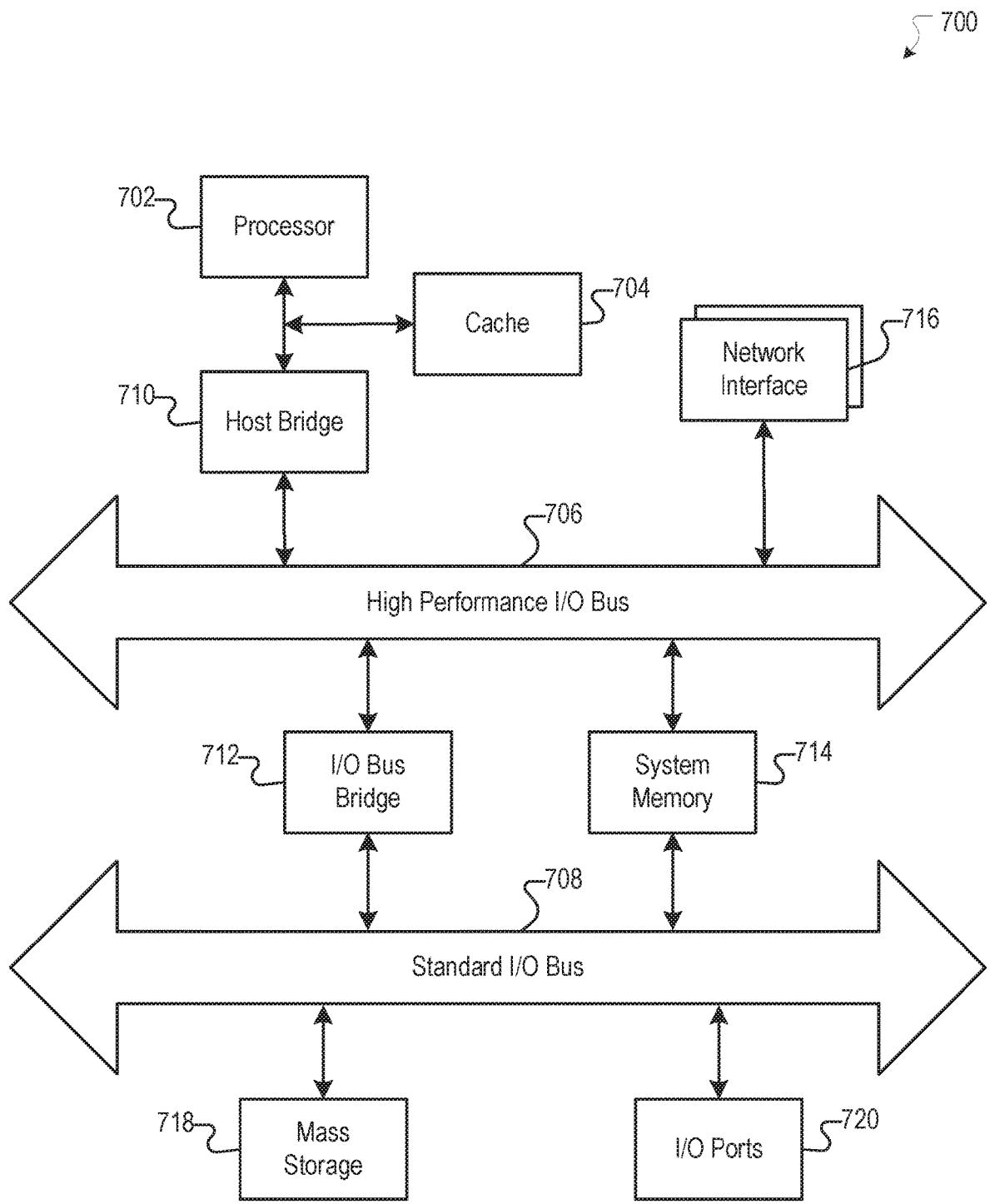
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a computing system, a quick load article comprising a quick load embedded web content element, wherein the quick load embedded web content element comprises:
        embedded web content element information identifying an embedded web content element, and
        snapshot information identifying a snapshot associated with the embedded web content element; and
    providing, by the computing system, the quick load article, wherein the quick load article allows for the snapshot to render within the quick load article in place of the embedded web content element.

2. The computer-implemented method of claim 1, further comprising:
    parsing, by the computing system, an article comprising media content elements, wherein the media content elements comprise the embedded web content element; and
    wherein generating the quick load article is based in part on the article.

3. The computer-implemented method of claim 2, wherein the media content elements further comprise a text element, an image element, or a video element.

4. The computer-implemented method of claim 2, wherein the embedded web content element is included in a plurality of embedded web content elements and wherein the quick load article comprises a plurality of quick load embedded web content elements associated with the plurality of embedded web content elements.

5. The computer-implemented method of claim 4, wherein the quick load article allows for a plurality of snapshots to render within the quick load article in place of the plurality of embedded web content elements.

6. The computer-implemented method of claim 1, wherein the snapshot associated with the embedded web content element is an image of the embedded web content element rendered on a mobile device.

7. The computer-implemented method of claim 6, wherein the snapshot is included in a plurality of snapshots associated with the embedded web content element.

8. The computer-implemented method of claim 7, wherein the plurality of snapshots is a plurality of images of the web content element rendered on a plurality of mobile devices associated with a plurality of screen dimensions or screen resolutions.

9. The computer-implemented method of claim 8, wherein the quick load article is provided in response to a quick load article request comprising mobile device information, screen dimension information, or screen resolution information.

10. The computer-implemented method of claim 9, wherein the snapshot associated with the embedded web content element is selected from the plurality of snapshots based in part on the mobile device information, the screen dimension information, or the screen resolution information.

11. A system comprising:
    at least one processor; and
    a memory storing instructions that, when executed by the at least one processor, cause the system to perform a method comprising:
        generating a quick load article comprising a quick load embedded web content element, wherein the quick load embedded web content element comprises:
            embedded web content element information identifying an embedded web content element, and
            snapshot information identifying a snapshot associated with the embedded web content element; and
        providing the quick load article, wherein the quick load article allows for the snapshot to render within the quick load article in place of the embedded web content element.

12. The system of claim 11, further comprising:
    parsing an article comprising media content elements, wherein the media content elements comprise the embedded web content element; and
    wherein generating the quick load article is based in part on the article.

13. The system of claim 12, wherein the media content elements further comprise a text element, an image element, or a video element.

14. The system of claim 12, wherein the embedded web content element is included in a plurality of embedded web content elements and wherein the quick load article comprises a plurality of quick load embedded web content elements associated with the plurality of embedded web content elements.

15. The system of claim 14, wherein the quick load article allows for a plurality of snapshots to render within the quick load article in place of the plurality of embedded web content elements.

16. A non-transitory computer-readable storage medium including instructions that, when executed by at least one processor of a computing system, cause the computing system to perform a method comprising:
    generating a quick load article comprising a quick load embedded web content element, wherein the quick load embedded web content element comprises:
        embedded web content element information identifying an embedded web content element, and
        snapshot information identifying a snapshot associated with the embedded web content element; and
    providing the quick load article, wherein the quick load article allows for the snapshot to render within the quick load article in place of the embedded web content element.

17. The non-transitory computer-readable storage medium of claim 16, further comprising:
    parsing an article comprising media content elements, wherein the media content elements comprise the embedded web content element; and
    wherein generating the quick load article is based in part on the article.

18. The non-transitory computer-readable storage medium of claim 17, wherein the media content elements further comprise a text element, an image element, or a video element.

19. The non-transitory computer-readable storage medium of claim 17, wherein the embedded web content element is included in a plurality of embedded web content elements and wherein the quick load article comprises a plurality of quick load embedded web content elements associated with the plurality of embedded web content elements.

20. The non-transitory computer-readable storage medium of claim 19, wherein the quick load article allows for a plurality of snapshots to render within the quick load article in place of the plurality of embedded web content elements.

* * * * *